United States Patent
Emigh et al.

(10) Patent No.: US 9,922,539 B1
(45) Date of Patent: Mar. 20, 2018

(54) SYSTEM AND METHOD OF TELECOMMUNICATION NETWORK INFRASTRUCTURE ALARMS QUEUING AND MULTI-THREADING

(71) Applicant: Sprint Communications Company L.P., Overland Park, KS (US)

(72) Inventors: Michael A. Emigh, Tokyo (JP); Brian D. Lushear, Winter Springs, FL (US); Ravi N. Malghan, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/230,335

(22) Filed: Aug. 5, 2016

(51) Int. Cl.
   *G08B 29/00* (2006.01)
   *G08B 25/10* (2006.01)

(52) U.S. Cl.
   CPC .................................. *G08B 25/10* (2013.01)

(58) Field of Classification Search
   CPC .......................... G06F 11/0748; G06F 11/2257
   See application file for complete search history.

(56) References Cited

U.S. PATENT DOCUMENTS

| | | | | |
|---|---|---|---|---|
| 2003/0093521 | A1* | 5/2003 | Schlonski | H04L 41/12 709/224 |
| 2011/0264956 | A1* | 10/2011 | Ito | G06F 11/0748 714/20 |
| 2013/0290784 | A1* | 10/2013 | Morimura | G06N 5/025 714/26 |
| 2014/0095240 | A1* | 4/2014 | White | G06Q 10/06311 705/7.15 |
| 2015/0227404 | A1* | 8/2015 | Rajagopal | G06F 11/0748 714/37 |

* cited by examiner

*Primary Examiner* — Fabricio R Murillo Garcia

(57) ABSTRACT

A telecommunications network infrastructure alarms processing system. The system comprises a processor, a non-transitory memory, an alarm collection application and an alarm processing application stored in the non-transitory memory. The alarm collection application pulls alarms from a data store and stores each alarm on a process pending queue. The alarm processing application takes alarms from the process pending queue, determines an identity of network equipment inventory corresponding to each alarm, determines an alarm signature of each alarm, builds enriched alarms comprising corresponding alarm signatures and a management identity of network equipment inventory, places the enriched alarms on a network operations center (NOC) queue, and launches alarm transmission threads for each different cell site, where threads retrieve enriched alarms from the NOC queue and sends enriched alarms to a network operations center (NOC) tool in time order by cell site.

19 Claims, 4 Drawing Sheets

SYSTEM AND METHOD OF TELECOMMUNICATION NETWORK INFRASTRUCTURE ALARMS QUEUING AND MULTI-THREADING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications network infrastructure may be large complicated systems that are challenging to monitor and identify operational statuses to be notified to network operations center (NOC) employees. NOC employees may be assisted in learning the current state of the telecommunications network by a NOC tool that provides a variety of windows onto the complete telecommunications network. The NOC tool may provide an alarms window, status of network work orders, bandwidth figures of merits at different points in the network, and other network status. Because a telecommunications network, for example a wireless communication network (e.g., a "cell phone" network), may include tens of thousands of cell sites or cell towers located coast to coast, NOC tools desirably present a "network at a glance" kind of view with functions for drilling down for more specific details on specific network equipment items, as needed.

SUMMARY

In an embodiment, a telecommunications network infrastructure alarms processing system is disclosed. The system comprises a processor, a telecommunications network equipment inventory data story, a non-transitory memory, an alarm collection application stored in the non-transitory memory, and an alarm processing application stored in the non-transitory memory. The alarm collection application, when executed by the processor, pulls alarms from a source alarm data store on a periodic interval and stores each alarm pulled from the source alarm data store on a process pending queue. The alarm processing application, when executed by the processor, takes alarms from the process pending queue, determines a fault key for each alarm, where the fault key is a hash of an identity of an equipment item that experiences the associated alarm, determines an alarm key corresponding to each alarm that is unique for each alarm, and determines an alarm signature corresponding to each alarm, where the alarm signature identifies a vendor of an equipment item associated with the alarm, an equipment item associated with the alarm, and an alarm condition. The alarm processing application further accesses and reads a management identity of the item of network equipment inventory corresponding to each alarm from the telecommunications network equipment inventory data store based on the fault key of the associated alarm, builds enriched alarms corresponding to at least some of the alarms, where each enriched alarm comprises the alarm key corresponding to an associated alarm, the alarm signature corresponding to the associated alarm, and the management identity, places the enriched alarms on a network operations center (NOC) queue, and launches enriched alarm transmission threads for each different cell site based on network equipment inventory identity, where threads retrieve enriched alarms from the NOC queue and send enriched alarms to a network operations center (NOC) tool in time order by cell site.

In another embodiment, a telecommunications network infrastructure alarms processing system is disclosed. The system comprises a processor, a telecommunications network equipment inventory data store, a non-transitory memory, an alarm collection application stored in the non-transitory memory, and an alarm processing application stored in the non-transitory memory. When executed by the processor, the alarm collection application pulls alarms from a source alarm data store on a periodic interval and stores each alarm pulled from the source alarm data store on a process pending queue. When executed by the processor, the alarm processing application takes alarms from the process pending queue, determines an identity of an item of network equipment corresponding to each alarm, determines a fault key based on the identity of the network equipment item, determines an alarm key corresponding to each alarm that is unique to each alarm, and determines an alarm signature corresponding to each alarm where the alarm signature identifies a vendor of an equipment item associated with the alarm, an equipment item associated with the alarm, and an alarm condition. The alarm processing application further looks up a management identity of the item of network equipment corresponding to each alarm based on referencing the telecommunications network equipment inventory data store using the fault key of the associated alarm, builds enriched alarms corresponding to at least some of the alarms, where the enriched alarms comprise corresponding alarm keys, corresponding alarm signatures, and corresponding management identities, creates a plurality of consolidated enriched alarms, where each consolidated enriched alarm is created from a plurality of related enriched alarms, places consolidated enriched alarms and at least some of the enriched alarms on a network operations center (NOC) queue, and launches enriched alarm transmission threads for each different cell site based on network equipment inventory identity, where threads retrieve consolidated enriched alarms and enriched alarms and sends consolidated enriched alarms and enriched alarms to a network operations center (NOC) tool in time order by cell site.

In yet another embodiment, a method of providing telecommunications network infrastructure alarms is disclosed. The method comprises pulling alarms from a source alarm data store on a periodic basis by an alarm collection application executing on a computer system, placing the alarms on a process pending queue by the alarm collection application, taking alarms off the process pending queue by an alarm processing application executing on a computer system. The method further comprises, for each alarm, determining by the alarm processing application an identity of an item of network equipment inventory corresponding to the alarm, for each alarm, determining a fault key by the alarm processing application based on the identity of the item of network equipment associated with the alarm, determining an alarm key for each alarm by the alarm processing application, and determining an alarm signature for each alarm by the alarm processing application. The method further comprises identifying different alarms that have different alarm keys but that are related to the same on-going alarm events by the alarm processing application, determining by the alarm processing application that an enriched alarm has been transmitted to a network operations center (NOC) tool related to the on-going alarm events and suppressing transmission of additional enriched alarms related to the on-going alarm events to the NOC tool, placing enriched alarms on a network operations center (NOC) queue by the alarm processing application, where the enriched alarms comprise the alarm key, the alarm signature, and a management identity of the item of network equipment corresponding to the alarm looked up from a telecommunications network equipment inventory data store based on the fault id, and where the enriched alarms placed on the NOC queue do not include the enriched alarms related to the on-going alarm events, sorting enriched alarms on the NOC queue by the alarm processing application according to the network equipment inventory identity associated with the enriched alarms onto different execution threads for each different cell site, and transmitting the enriched alarms by each execution thread to the NOC tool in a time sequenced order based on a date-time stamp in the alarm key of the enriched alarms.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
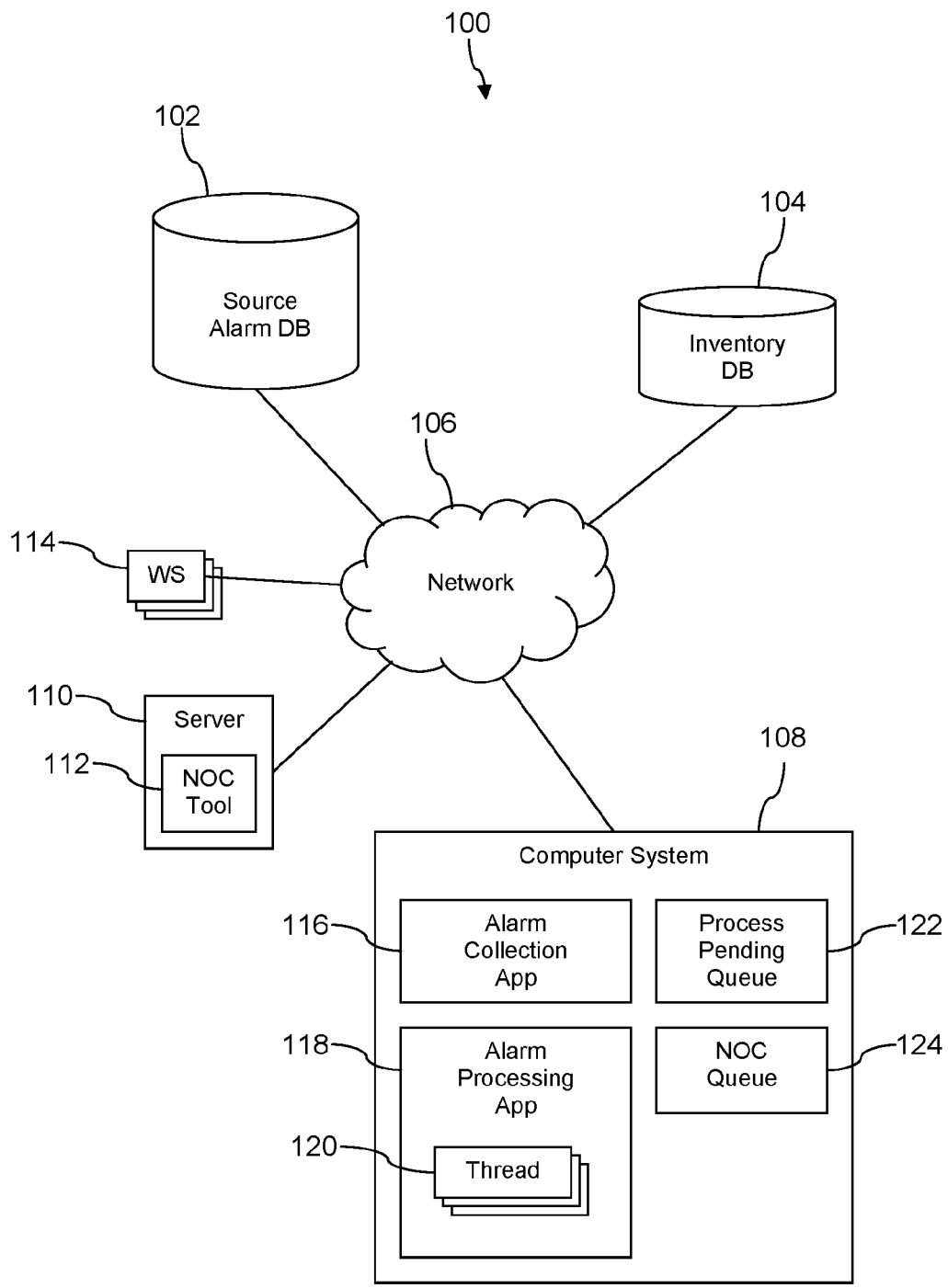
FIG. 1 is a block diagram of a telecommunications network infrastructure alarm system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system for processing telecommunications network infrastructure alarms is taught. The system collects alarms from a raw data store, processes the alarms to make them more accessible and meaningful to a downstream network operations center (NOC) tool as well as to reduce the processing load associated with some duplicative information in the raw data store. For example, the system identifies alarms that are associated with other alarms and may consolidate the information into a single enriched alarm, thereby reducing the load on the NOC tool that the enriched alarms are sent to. For example, each enriched alarm that is sent to the NOC tool is transmitted using an application programming interface (API) method call to the NOC tool, where each API method call consumes about 1 second of processing time on a computer system that the NOC tool executes upon. Such consolidated enriched alarms may include an initial alarm condition event followed by a subsequent alarm clear event. This pair of alarm messages can be readily consolidated into a single message or enriched alarm. The API method may be provided as an interface by which the NOC tool receives such messages or enriched alarms.

Likewise, the system can determine that alarms which may give the impression of being entirely new are in fact merely repeated status messages. For example, an alarm related to an event of a generator turning on at a cell site that has lost power from the local electric power grid may be repeated every hour as the generator remains active (e.g., a "generator running" alarm or message). This repeated information, already known at the NOC, can be omitted, thereby reducing calls to the NOC API methods, each of which consumes about 1 second of processing time on a computer system that the NOC tool executes upon. The reduction of these repeated status messages and the reduced transmission of the related enriched alarms described above, when supported across a large telecommunications network infrastructure (for example more than 40,000 cell sites) can represent a significant processing relief to the computer system on which the NOC tool executes. It is understood that reducing the processing burden on a large computer system is an economic good, in that fewer computing resources may be sufficient to provide the desired processing and hence less expense is incurred. These efficiencies are realized by the specific information technology structures and methods described further herein.

The system uses two different queues for alarm related information—a process pending queue and a NOC queue. An alarm collection application or script pulls alarms from a source alarm data store or a raw alarm data store and places the retrieved alarms on a process pending queue. The source alarm data store may be a network management system (NMS) tool or layer. The alarm collection application may access the alarms by making calls to the NMS tool or layer. The alarm collection application places the alarm on the process pending queue. The alarm collection application pulls from the raw alarm data store at a periodic rate.

An alarm processing application or script pulls alarms from the process pending queue and performs a variety of processing on the alarms. The alarm processing application parses or analyzes the content of each alarm to determine an alarm key, an alarm signature, an alarm severity, and optionally additional information. The additional information may comprise an indication of the alarm being new, being cleared, being deleted, being updated, or another status. The additional information may comprise an alarm condition or reason. The alarm key may be abstracted to be a unique identifier of an alarm. In an embodiment, the alarm key comprises a source identity, a serial number associated with that specific alarm source, and a date-time stamp of the alarm. The alarm signature may be abstracted as an alarm category. In an embodiment, the alarm signature identifies an equipment vendor, a communication technology, a vendor code identifying an alarm condition or reason, and possibly additional information or fields. The alarm condition or reason identifies the subject of the alarm, for example card fault, power off, or other.

The alarm processing application also determines a fault key based on the alarm. In an embodiment, the fault key is a kind of hash or digest of the identity of the network node associated with the alarm, the identity of the equipment item associated with the alarm, and optionally the identity of one or more sub-components associated with the alarm. The alarm processing application uses the fault key to index into a data store of network inventory. The network inventory data store identifies all equipment in the communication network in a hierarchical organization. The entries in the network inventory data story comprise a corresponding fault key that likewise is a hash or digest of determined based on the identity of the equipment. Thus, the fault key determined from the alarm matches the fault key of one or more entries in the network inventory.

Different entries in the network inventory can have different numbers of fields of equipment identity. For example, an entry corresponding to a cell site equipment item may have a field for a cell site identity but not have fields for a cabinet identity, a rack identity, or a slot identity. By contrast, an entry corresponding to a specific processor may have fields for each of a cell site identity, a cabinet identity, a rack identity, and a slot identity. If searching for entries in the network inventory data base were performed on the basis of specifying values of each of the equipment identity field values (i.e., each of a cell site identity, a cabinet identity, a rack identity, and a slot identity), the searching logic may be more complicated and processing intensive, because many different special cases would need to be explicitly handled (searching for an equipment item with only a cell site identity field being a first special case, searching for an equipment item with both a cell site identity field and a cabinet identity field being a second special case, etc.). Using the fault key, however, simplifies the search logic. Any combination of equipment identity fields can be hashed to create a fault key, and the same search logic (i.e., without addressing special cases individually as indicated above) can be used to search for any fault key. The use of the hashed identity provides benefits when searching for network equipment which does not fit the common mold of wireless telecommunications network equipment identification—for example special cases or exceptions. An example of this may be an Internet Protocol (IP) aggregator node, a domain name system (DNS) server, a session border controller host, and other network equipment.

The alarm processing application parses the row or rows referenced by the fault key to identify a process identity (proc ID) and a cascade identity (cascade ID) that identifies for the NOC tool the specific network equipment associated with the alarm. The proc ID and the cascade ID may be referred to as a management identity, in that this management identity is used by the NOC tool to reference and identify network equipment items. The NOC tool may use both the proc ID and the cascade ID to reference network equipment items in the network inventory data store, just the cascade ID to reference network equipment items in the network inventory data store, or just the proc ID to reference network equipment items in the network inventory data store. It is understood that in another embodiment, the management identity may be composed of different identity components in addition to or instead of one or more of the proc ID and the cascade ID.

The alarm processing application further determines an operation status of the network equipment referenced by the fault key in the network inventory. The operation status may be active, off-line, in turn up, or other. If the operation status indicates that the subject equipment is not carrying customer communications loads, the alarm processing application may drop processing of the associated alarm and alarm information and not send enriched alarm information related to that alarm to the NOC tool. This may be referred to as filtering alarms. Other specific conditions under which alarms are filtered (dropped and not transmitted to the NOC tool) by the alarm processing application are discussed further below.

The alarm processing application determines if an enriched alarm corresponding to the alarm being processed is already on the NOC queue. If this is the case, the alarm processing application consolidates and/or combines the new information in the alarm it is processing with the previously existing enriched alarm stored on the NOC queue. Otherwise the alarm processing application builds an enriched alarm that comprises the proc ID, the cascade ID (i.e., the management identity), the alarm key, the alarm signature, the alarm severity, and additional information related to the alarm retrieved from the source alarm data store. The alarm processing application may then place the enriched alarm on the NOC queue for sending out to the NOC tool.

Thus, the alarm processing application works to analyze, transform, and enrich the alarms taken from the process pending queue to migrate them to or place them on the NOC queue. But further, the alarm processing application continues to refine and elaborate the enriched alarms placed on the NOC queue up and until they are actually processed out and/or sent to the NOC tool.

The alarm processing application then groups the enriched alarms on the NOC queue by the cell sites that the enriched alarms are each associated with (e.g., what cell site incorporates the equipment item the enriched alarm is associated with). Enriched alarms on the NOC queue are then associated with a processing thread associated to their specific associated cell site, and each of the processing threads sends its enriched alarms to the NOC tool in time-date order. The result of this is that the enriched alarms sent to the NOC are serialized, avoiding the difficulty of the NOC tool receiving an enriched alarm identifying an alarm clear before receiving the associated enriched alarm identifying a new alarm. In this way, alarms are transferred and transformed from the alarm raw data store to the process pending queue, from the process pending queue to the NOC queue (as enriched alarms), and from the NOC queue sent (in the form of enriched alarms) to the NOC tool, with various processing and enrichment of the alarm information.

It is observed that the use of separate queues provides some benefits in processing a large volume of telecommunications network infrastructure alarms. For example, in such a large system (e.g., more than 40,000 cell sites) it becomes a challenge to sequence related alarm events, for example to send an alarm clear event to the NOC tool only after sending the associated new alarm event to the NOC tool. By first collecting alarms in the process pending queue, processing from those collected alarms and placing them on the NOC queue, and then selecting and sequencing the alarms to cell site dedicated processing threads provides benefits in meeting the challenges of sequencing these large volumes of alarms and reducing the processing burdens on the NOC tool. The use of separate queues also promotes partitioning the work being done and to separate external dependencies and interfaces (thus, the alarm collection application interfaces with the source alarm data store but not to the NOC tool; and the process pending application interfaces with the NOC tool but not to the source alarm data store.

In an embodiment, some of the enriched alarms that are processed and stored on the NOC queue may be held and not sent on to the NOC tool for a minimum amount of time, for example on the expectation that a subsequent related alarm or alarm message may be received that can be consolidated with the earlier enriched alarm. This can be done selectively and opportunistically based on the alarm signature. The system may analyze histories of alarms to identity alarm signatures or categories whose alarms are likely to be updated during relatively short windows of time. For example, alarms sharing a given alarm signature may be cleared 80% of the time within two minutes of initial creation of the alarm, for example in response to automated corrective action performed within the telecommunications network infrastructure. Enriched alarms having this alarm signature may be held a minimum of five minutes on the expectation that a corresponding clear alarm may be received and can be bundled or consolidated with the original enriched alarm to reduce the number of API calls. Such enriched alarms that combine information about an initial alarm and a subsequence alarm clear event may be referred to in some contexts as an informational event or an informational enriched alarm. This process of temporarily holding or delaying sending of enriched alarms in the NOC queue may be referred to as enriched alarm aging. Enriched alarm aging comprises allowing a predefined period of time to pass between the date-time stamp associated with a new enriched alarm and when the enriched alarm is sent. This also may be described as delaying sending enriched alarms for such alarms.

The alarm processing script also examines enriched alarms in the NOC queue to identify alarms that have the look of being new alarms but are in fact status reporting messages on already known alarms, such as generator running alarms. This kind of enriched alarms are suppressed by the alarm processing script until the subject condition changes state, for example when the subject generator is turned off, when the associated enriched alarm is sent on to the NOC tool.

Turning now to FIG. 1, a system 100 is described. In an embodiment, system 100 comprises a source alarm data store 102, a telecommunications network infrastructure equipment inventory data store 104, a network 106, and a computer system 108. The system 100 further comprises a server 110 executing a network operations center (NOC) tool 112 and a plurality of work stations 114 that access the NOC tool 112 via the network 106. The network 106 may be one or more private networks, one or more public networks, or a combination thereof.

The source alarm data store 102 may store telecommunications network alarms related to state of network infrastructure equipment items or of services provided by the telecommunications network. In embodiment, the source alarm data store 102 may be a network management system (NMS) or a network management layer. In an embodiment, the source alarm data store 102 may be a NetCool® application that executes on a plurality of server computers and that provides access via application programming interface method calls to alarms received by NetCool® from cell sites and other telecommunications network infrastructure equipment. The alarms may indicate a failed state of an equipment item or an underperformance of an equipment item, which may be referred to as an alarm condition or alarm reason. The alarms may indicate the item of equipment that has experienced the subject alarm and a type of alarm. The alarms may further indicate a date and time of when the alarm was generated, which may be referred to as a date-time stamp.

The computer system 108 processes the raw alarms stored in the source alarm data store 102, based in part on network infrastructure equipment information stored in the inventory data store 104, to provide a more actionable and more useful view of alarms to NOC workers via their work stations 114 and via the NOC tool 112. The computer system 108 may provide enriched alarms to the NOC tool 112 that may remove some details that are irrelevant to the NOC tool 112 and may combine two or more alarms or alarm messages that are related (e.g., combine an initial alarm message with a subsequent alarm clear message). These enriched alarms may further comprise additional information accessed from the inventory data store 104. For example, the enriched alarms may comprise a proc ID and a cascade ID which are used by the NOC tool 112 to identify network infrastructure items that are represented in one or more user interface views on the work stations 114, saving the NOC tool 112 the time and trouble of looking up this information from the inventory data store 104 itself. The identity or identities that the NOC tool 112 may use to identify items of network equipment (e.g., the proc ID and cascade ID) may be generally referred to as a management identity.

The computer system 108 comprises an alarm collection application 116 and an alarm processing application 118. The alarm collection application 116 retrieves or collects alarms or copies of alarms from the source alarm data store 102 and places alarms to be processed (or copies of alarms to be processed) on a process pending queue 122. The alarm processing application 118 removes and processes those alarms placed on the process pending queue 122. The alarm collection application 116 executes periodically. The alarm processing application 118 begins executing after the alarm collection application 116 completes an execution cycle and completes it processing before the next iteration execution cycle of the alarm collection application 116.

The alarm processing application 118 enriches and transforms information in the alarms retrieved from the process pending queue 122 into enriched alarms that are, in time, sent to the NOC tool 112. Part of the processing by the alarm processing application 118 includes segregating the enriched alarms based on their associated cell site (the cell site within which the equipment associated with the alarm is located) and placing these enriched alarms on the NOC queue 124. In an embodiment, the alarm processing application 118 first checks the NOC queue 124 to see if a corresponding enriched alarm is already stored on the NOC queue 124. If there is a corresponding enriched alarm on the NOC queue 124, if the alarm in hand is a duplicate, further processing of that alarm is stopped. If the alarm in hand provides update information, the enriched alarm already stored on the NOC queue 124 may be modified to incorporate the new information, for example to include the information that the subject alarm has already cleared. The alarm processing application 118 then feeds these enriched alarms to a plurality of threads 120, each thread 120 being associated with a different cell site. In an embodiment, the process pending queue 122 and the NOC queue 124 may be implemented as data stores or databases.

In an embodiment, the alarm processing application 118 may spawn about 5 threads 120, about 10 threads 120, about 20 threads 120 or about 50 threads 120. Each thread 120 at any point in time may only process enriched alarms associated with a single cell site. The same thread 120, however, at different points in time may process enriched alarms from different cell sites. For example, a thread 120 may firstly process a first plurality of enriched alarms associated with a first cell site; later the same thread 120 may secondly process a second plurality of enriched alarms associated with a second cell site; and still later the same thread 120 may thirdly process a third plurality of enriched alarms associated with a third cell site; and so forth.

The alarms in the source alarm data store 102 may be stored there by cell sites, communication network nodes, or other network equipment. Some of the alarms may be duplicate alarms, for example alarms that repeat information about a condition or state of an equipment periodically. Some of the alarms may be associated with the same alarm, for example an alarm clear message associated with a previous alarm onset message.

The inventory data store 104 may comprise a hierarchical inventory or list of telecommunications network equipment. For example, a high level of inventory hierarchy may list each of a plurality of cell sites. For each cell site, a lower level of the inventory hierarchy may be a plurality of equipment cabinets located at the same cell site. For each equipment cabinet, a yet lower level of the inventory hierarchy may be a plurality of equipment racks associated with the same equipment cabinet. For each equipment rack, a still lower level of the inventory hierarchy may be a processing board or a disk drive or a radio transceiver or a power amplifier associated with the equipment rack. For a processing board, a yet lower level of the inventory hierarchy may be a specific processor among a plurality of processors located on the processor board. The equipment inventory of a cell site may include equipment that is not subsumed within equipment cabinets, for example batteries for powering the cell site during a loss of electrical mains power, an antenna array, and other equipment. The equipment inventory information may identify serial numbers of equipment, vendors who provided the equipment, hardware versions of the equipment, software versions associated with the equipment, and other information.

The equipment inventory information also may comprise one or more identifiers used by the NOC tool 112 to reference the equipment item identified in the inventory data store 104. In an embodiment, the equipment inventory information may comprise a proc ID and a cascade ID that may be used by the NOC tool 112 to identify network equipment items. The combination of these two may be referred to as a management identity of the network equipment item.

The equipment inventory information may comprise current operational status of equipment items, for example in-service, out-of-service, in turn up, and other operation modes that support determining whether the subject equipment item is carrying customer communication traffic at the present time. The equipment inventory information may further comprise a reference or key that corresponds to the fault key: a hash or digest of the identity of the network equipment identity (e.g., a node identity, a component identity, and optionally one or more sub-component identities). Every entry in the telecommunications network infrastructure equipment inventory data store 104 may have this reference or key stored with it. This reference or key may be referred to as a fault key and may be searched based on a corresponding fault key determined based on information received in alarms received from the source alarm data store 102.

The alarm collection application 116 periodically retrieves alarm events and/or alarm information from the source alarm data store 102. In an embodiment, this action may not remove the alarms from the source alarm data store 102. In an embodiment, this action may mark the alarms which have been retrieved or copied, whereby the alarm collection application 116 can avoid retrieving previously retrieved alarm events or alarm information. The alarm collection application 116 may retrieve alarm events or information about every thirty seconds, about every one minute, about every five minutes, about every fifteen minutes, or on some other periodic interval.

The alarm processing application 118 provides a variety of processing to alarms that it removes from the process pending queue 122. The alarm processing application 118 may parse the alarm to access different parts of the information in the alarm. The alarm processing application 118 may use some of the parsed alarm information to match the alarm to an inventory element in the inventory data store 104. For example, the alarm processing application 118 may generate a fault key that is a hash or other algorithmic digest of the identity of the network node associated with the alarm, the identity of the equipment component associated with the alarm, and optionally the identity of one or more sub-components associated with the alarm. The alarm processing application 118 may use the fault key as a reference into the network infrastructure equipment inventory data store 104 to look up information related to the equipment item involved in the alarm. The looked-up information may comprise a proc ID, a cascade ID, and an operational status of the equipment item. For example in-service, out-of-service, in turn up, and other operation modes that support determining whether the subject equipment item is carrying customer communication traffic at the present time. The 'in turn up' status may mean the subject equipment item is being provisioned or otherwise brought into service but is not currently carrying communication traffic. Alternatively, the fault key may be used to look up a management identity associated with the network equipment item.

The alarm processing application 118 can determine an alarm key and an alarm signature from the alarm retrieved from the process pending queue 122. The alarm key may comprise a source identity, a serial number associated with that specific alarm source, and a date-time stamp of the alarm. The source identity may be a server identity of a network management system server that receives alarms from network infrastructure equipment, for example a NetCool® server. The serial number may be a number in a constrained range (0 to 65535 [i.e., a 16 bit number], 0 to 4,294,967,295 [i.e., a 32 bit number], or some other range). Over time, this serial number may roll over and begin repeating for a given server. The combination of the server identity, the serial number, and the time-date stamp, however, should be unique and hence able to distinguish any two alarms in the source alarm data store 102. In an embodiment, the alarm signature may comprise an equipment vendor identity, a communication technology identity, a vendor code (e.g., an alarm reason or alarm condition), and possibly additional information or fields.

The alarm processing application 118 may combine multiple alarms associated with the same enriched alarm, which may be referred to as consolidated enriched alarms. For example, the alarm processing application 118 may first search the NOC queue 124 to determine if an enriched alarm associated with the same alarm condition is already in the NOC queue 124. If this is so, the alarm processing application 118 may discard the in-hand alarm or it may consolidate the information provided by the in-hand alarm with the enriched alarm already stored on the NOC queue 124.

In an embodiment, some alarms may be filtered by the alarm processing application 118. Filtering may comprise eliminating alarms that cannot be processed by the NOC tool 112. For example, new alarms (e.g., alarms associated with a new alarm signature or alarm category) may be generated by telecommunications network equipment that the NOC tool 112 is not capable of handling, for example because the NOC tool 112 has not been updated to respond to recently deployed network infrastructure equipment or respond to recently installed software revisions on network infrastructure equipment. Said in other words, some alarm signatures or categories may not be supported by the NOC tool 112 or may be said to be unsupported by the NOC tool 112. Other alarms may be filtered and eliminated because the alarms are associated with an earlier transmitted alarm, for example a generator on alarm that had been sent previously. This may also be referred to as a generator running alarm event. The system 100 may comprise an alarm processed table. This can be searched to find on-going events or on-going alarm to avoid sending busy, repetitive messages, for example repeated enriched alarms each indicating the generator is still on at a given cell site. Other alarms may be filtered because the equipment associated with the alarm is not carrying communication traffic at the present time, for example, the associated network infrastructure equipment may be off-line or in turn up operation mode. Filtering means the associated alarm is not sent in the form of an enriched alarm to the NOC tool 112.

The alarm processing application 118 may group or segregate enriched alarms based on cell sites and assign them to be processed by threads 120 in date-time stamp order. It is understood that segregating enriched alarms based on cell sites means associating each enriched alarm to a cell site that comprises or contains the equipment item identified in the subject enriched alarm. In an embodiment, the alarm processing application 118 may provide enriched alarm aging functionality for alarms associated with selected or predefined alarm signatures or categories. For example, it may be understood that alarms associated to some alarm signatures historically are cleared promptly. Enriched alarms having that alarm signature may be held for a predetermined period of time, for example up to five minutes, in the expectation that an associated clear alarm message will be received and thus a single consolidated enriched alarm can be sent via the NOC queue 124 to the NOC tool 112. This may be referred to as an informational enriched alarm. These alarms may be turned into consolidated enriched alarms in a manner like the creation of enriched alarms. As an example of such alarm signatures that may be associated with a new alarm followed shortly by an alarm clear, microwave facilities of cell sites can experience short term alarms, for example an antenna temporarily out of alignment due to a gust of wind that restores to desired alignment or is remotely repositioned to desired alignment.

When the computer system 108 sends the enriched alarms to the NOC tool 112 via the network 106, the NOC tool 112 may store the enriched alarms. The NOC tool 112 may present information on user interfaces of work stations 114 based on the enriched alarms, for example based on a management identity and/or based on a proc ID and cascade ID encapsulated in the enriched alarm, the NOC tool 112 may cause a red dot to appear proximate to an icon representing a network equipment item such as a cell site. The NOC tool 112 may perform some automated actions based on the enriched alarms, for example some of the enriched alarms may cause the NOC tool 112 to automatically reset specific alarmed equipment in a specific cell tower. Some of enriched alarms may cause the NOC tool 112 to automatically initiate further diagnostic procedures on equipment in the subject cell site. Some of the enriched alarms may cause the NOC tool 112 to automatically open a service case or trouble ticket that is assigned to a responsible administrator to review and address appropriately. Alarm processing provided by the computer system 108 above can streamline the processing of alarms and the generation of enriched alarms for the NOC tool 112.

While the alarm collection application 116 and the alarm processing application 118 are illustrated executing on a single computer system 108, it is understood this could comprise the alarm collection application 116 executing on a first server computer of the computer system 108 and the alarm processing application 118 executing on a second server computer of the computer system 108. Additionally, in an embodiment, the alarm collection application 116 may be implemented as a computer script. In an embodiment, the alarm processing application 118 may be implemented as a computer script. Computers and computer systems are described further hereinafter.

Figure 2A:
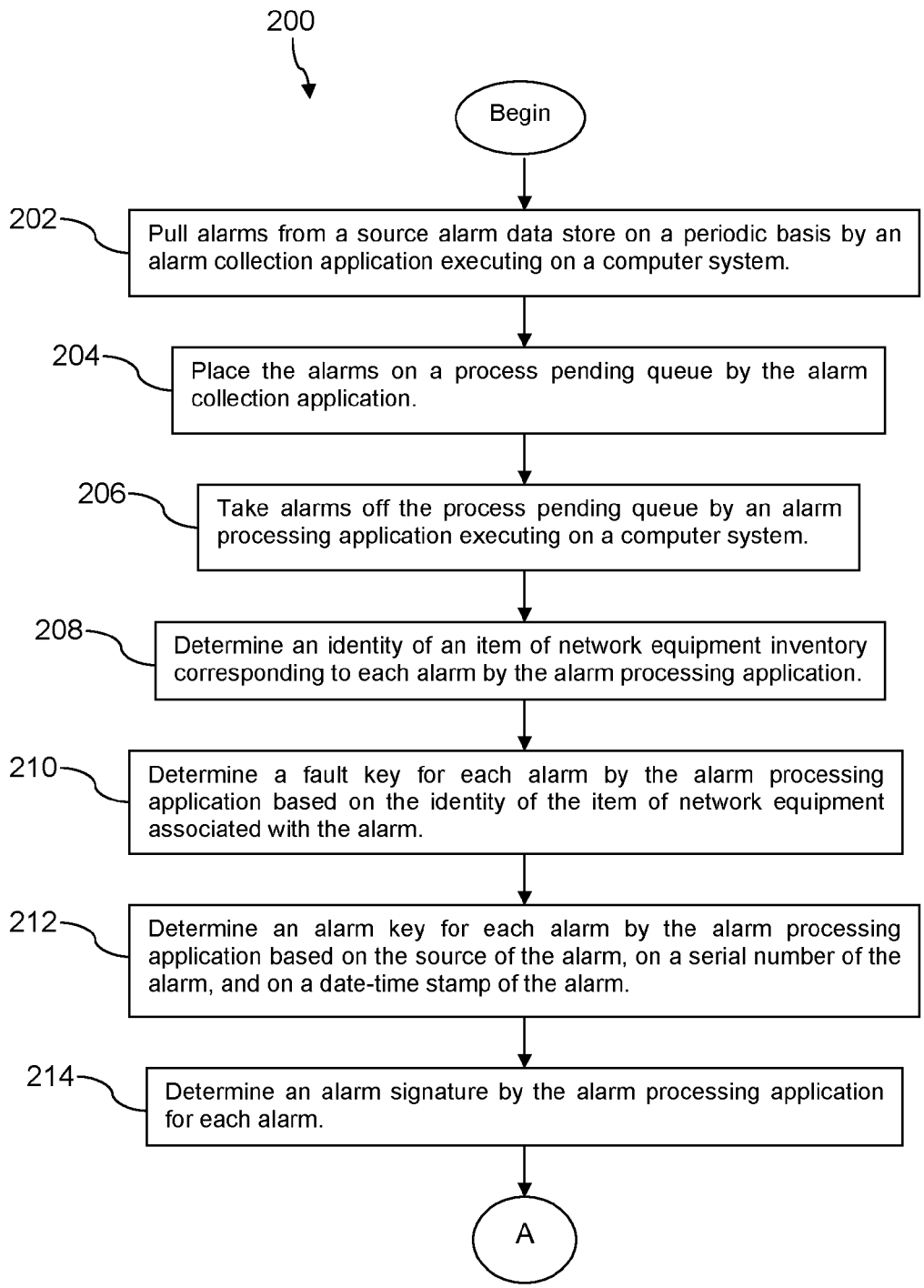
FIG. 2A and FIG. 2B are a flow chart of a method according to an embodiment of the disclosure.
Figure 2B:
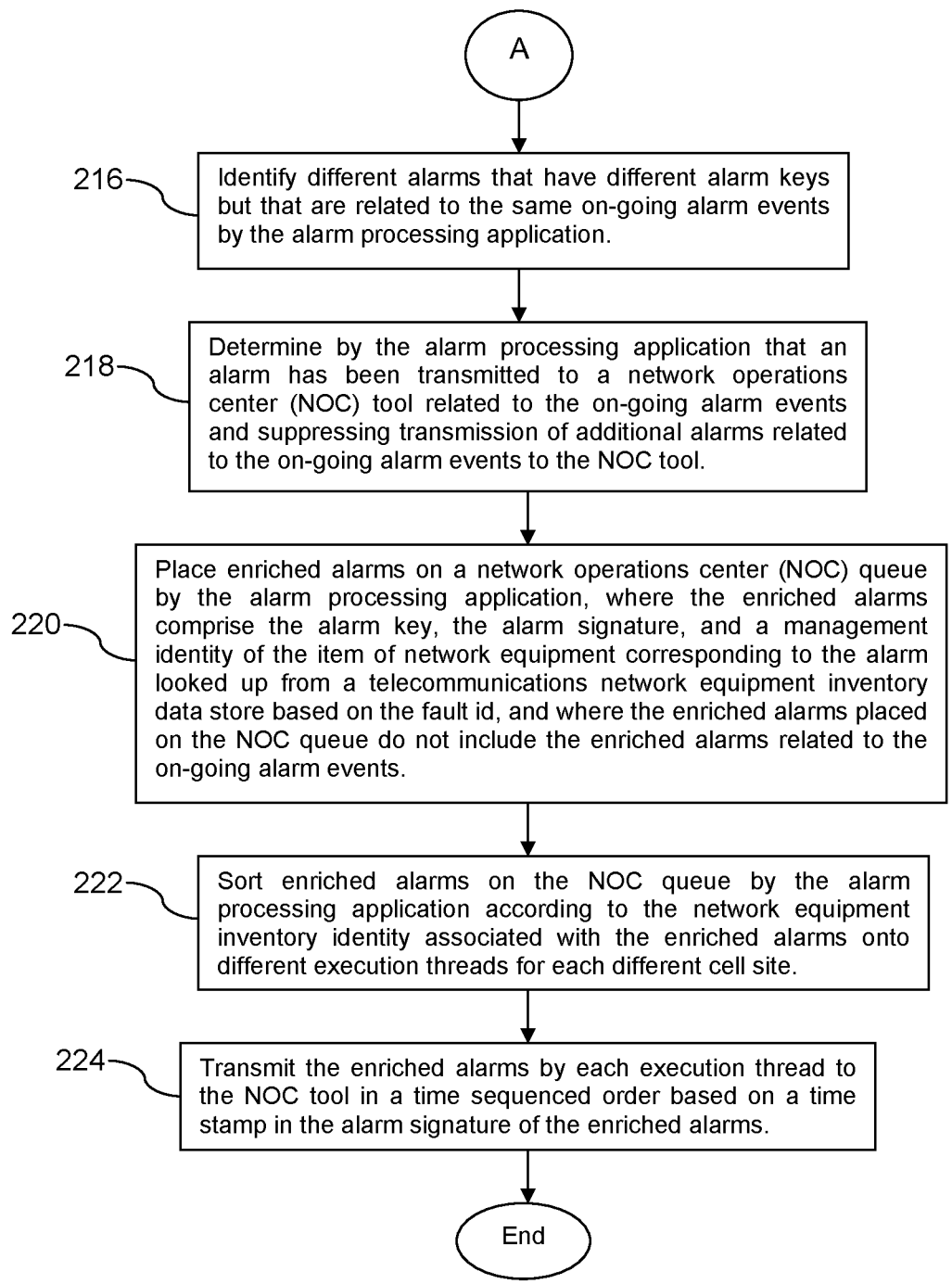

Turning now to FIG. 2A and FIG. 2B, a method 200 is described. At block 202, pull alarms from a source alarm data store on a periodic basis by an alarm collection application executing on a computer system. At block 204, place the alarms on a process pending queue by the alarm collection application. At block 206, take alarms off the process pending queue by an alarm processing application executing on a computer system. At block 208, for each alarm, determine by the alarm processing application an identity of an item of network equipment inventory corresponding to the alarm, for example by reading an alarm summary of the alarm. At block 210, for each alarm, determine a fault key by the alarm processing application based on the identity of the item of network equipment associated with the alarm. This may comprise hashing or determining another digest of the various equipment item identities. For example, the node identity of a cell tower may be concatenated with an equipment item identity and a sub-component identity and this concatenated string hashed or processed to generate a fault key that can be used to readily search a data store, for example to search the telecommunications network infrastructure equipment inventory data store 104.

At block 212, determine an alarm key for each alarm by the alarm processing application. At block 214, determine an alarm signature for each alarm by the alarm processing application. At block 216, identify different alarms that have different alarm keys but that are related to the same on-going alarm events by the alarm processing application. In an embodiment, this may be done selectively for alarms belonging to selected alarm signatures or alarm categories (e.g., selectively for alarms belonging to the "generator running" alarm signature). At block 218, determine by the alarm processing application that an enriched alarm has been transmitted to a network operations center (NOC) tool related to the on-going alarm events and suppressing transmission of additional enriched alarms related to the on-going alarm events to the NOC tool.

At block 220, place enriched alarms on a network operations center (NOC) queue by the alarm processing application, where the enriched alarms comprise the alarm key, the alarm signature, and a management identity of the item of network equipment corresponding to the alarm looked up from a telecommunications network equipment inventory data store based on the fault id, and where the enriched alarms placed on the NOC queue do not include the enriched alarms related to the on-going alarm events. The enriched alarms may comprise further information such as a severity value.

At block 222, sort enriched alarms on the NOC queue by the alarm processing application according to the network equipment inventory identity associated with the enriched alarms onto different execution threads for each different cell site. At block 224, transmit the enriched alarms by each execution thread to the NOC tool in a time sequenced order based on a date-time stamp in the alarm key of the enriched alarms.

Figure 3:
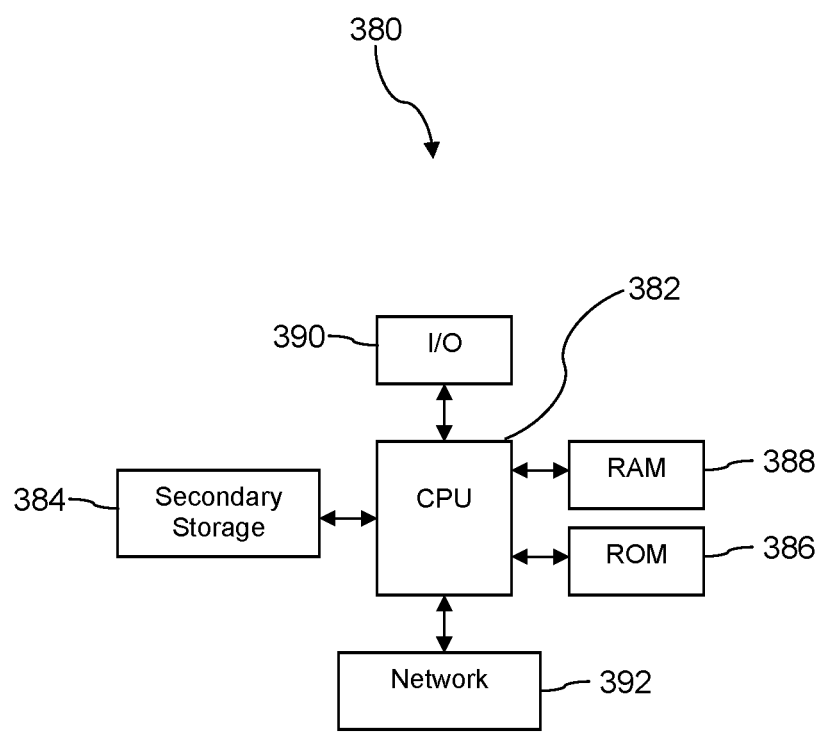
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A telecommunications network infrastructure alarms processing system, comprising:
   a processor;
   a telecommunications network equipment inventory data store on a server computer;
   a non-transitory memory;
   an alarm collection application stored in the non-transitory memory that, when executed by the processor,
      pulls, on periodic basis, a plurality of alarms from a source alarm data store on a server computer, wherein each of the plurality of alarms comprise a failed state of a piece of equipment or an underperformance of a piece of equipment, and
      stores each alarm of the plurality of alarms pulled from the source alarm data store on a process pending queue; and
   an alarm processing application stored in the non-transitory memory that, when executed by the processor,
      takes the plurality of alarms from the process pending queue,
      determines a fault key for each alarm of the plurality of alarms, wherein the fault key is a digest of an identity of an equipment item that experiences a corresponding alarm, determines a unique alarm key corresponding to each alarm of the plurality of alarms, wherein the unique alarm key comprises an identity of a server computer associated with the source alarm data store, a serial number associated with the alarm associated with the unique alarm key, and a date-time stamp of the alarm associated with unique alarm key, determines an alarm signature corresponding to each alarm of the plurality of alarms, wherein the alarm signature identifies a vendor of an equipment item associated with the alarm, an equipment item associated with the alarm, and an alarm condition, and wherein the vendor provided the equipment item, accesses and reads a management identity of the item of network equipment inventory corresponding to each alarm of the plurality of alarms from the telecommunications network equipment inventory data store based on the fault key of the corresponding alarm, builds a plurality of enriched alarms corresponding to at least some of the plurality of alarms, wherein each of the plurality of enriched alarms comprises the unique alarm key corresponding to an associated alarm, the alarm signature corresponding to the associated alarm, and the management identity corresponding to the associated alarm, places the plurality of enriched alarms on a network operations center (NOC) queue, launches a plurality of enriched alarm transmission threads for each of a plurality of different cell sites based on network equipment inventory identity, wherein the plurality of enriched alarm transmission threads retrieve the plurality of enriched alarms from the NOC queue and send the plurality of enriched alarms to a network operations center (NOC) tool in time order by cell site, wherein the NOC tool is executed on a separate computer system.

2. The system of claim 1, wherein the periodic interval is about 1 minute.

3. The system of claim 1, wherein the date-time stamp of the alarm used in the unique alarm key is a first occurrence of the alarm date-time stamp.

4. The system of claim 1, wherein the alarm processing application delays sending some of the plurality of enriched alarms for the some of the plurality of enriched alarms to perform enriched alarm aging processing.

5. The system of claim 4, wherein the enriched alarm aging processing comprises allowing a predefined period of time pass between a date-time stamp associated with a new alarm before sending an associated enriched alarm.

6. The system of claim 5, wherein the predefined period of time is configured based on statistical analysis of alarms of the same alarm signature that determine a probability of an alarm clear event occurring within the predefined period of time after the date-time stamp of the new alarm.

7. The system of claim 1, wherein the alarm processing application filters some alarms of the plurality of alarms taken from the process pending queue and does not send an associated enriched alarm associated with the filtered alarms.

8. A telecommunications network infrastructure alarms processing system, comprising:
a processor;
a telecommunications network equipment inventory data store on a server computer;
a non-transitory memory;
an alarm collection application stored in the non-transitory memory that, when executed by the processor,
pulls, on a periodic basis, a plurality of alarms from a source alarm data store on a server computer, wherein each of the plurality of alarms comprise a failed state of a piece of equipment or an underperformance of a piece of equipment, and
stores each alarm of the plurality of alarms pulled from the source alarm data store on a process pending queue; and
an alarm processing application stored in the non-transitory memory that, when executed by the processor,
takes the plurality of alarms from the process pending queue,
determines an identity of an item of network equipment corresponding to each alarm of the plurality of alarms,
determines a fault key corresponding to each alarm of the plurality of alarms based on the identity of the network equipment item identified in a corresponding alarm,
determines a unique alarm key corresponding to each alarm of the plurality of alarms, wherein the unique alarm key comprises an identity of a server computer associated with the source alarm data store, a serial number associated with the alarm associated with the unique alarm key, and a date-time stamp of the alarm associated with unique alarm key,
determines an alarm signature corresponding to each alarm of the plurality of alarms, wherein the alarm signature identifies a vendor of an equipment item associated with the alarm, an equipment item associated with the alarm, and an alarm condition, and wherein the vendor provided the equipment item,
looks up a management identity of the item of network equipment corresponding to each alarm of the plurality of alarms based on referencing the telecommunications network equipment inventory data store using the fault key of the corresponding alarm,
builds a plurality of enriched alarms corresponding to at least some of the plurality of alarms, wherein the plurality of enriched alarms comprises corresponding unique alarm keys, corresponding alarm signatures, and corresponding management identities,
creates a plurality of consolidated enriched alarms, wherein each consolidated enriched alarm of the plurality of consolidated enriched alarms is created from a plurality of related enriched alarms,
places the plurality of consolidated enriched alarms and at least some of the plurality of enriched alarms on a network operations center (NOC) queue, and
launches a plurality of enriched alarm transmission threads for each of a plurality of different cell sites based on network equipment inventory identity, wherein the plurality of enriched alarm transmission threads retrieve the plurality of consolidated enriched alarms and the at least some of the plurality of enriched alarms and sends the plurality of consolidated enriched alarms and the at least some of the plurality of enriched alarms to a network operations center (NOC) tool in time order by cell site, wherein the NOC tool is executed on a separate computer system.

9. The system of claim 8, wherein each of the plurality of consolidated enriched alarms combines information from at least two different alarms of the plurality of alarms retrieved from the source alarm data store.

10. The system of claim 9, wherein at least some of the plurality of enriched alarms comprise an informational event, and wherein a new alarm event and an associated alarm clear event are identified in the informational event.

11. The system of claim 8, wherein the telecommunications network equipment inventory data store comprises a hierarchical inventory of telecommunications network equipment, and wherein each entry in the inventory data store comprises a corresponding fault key that is a digest of the identity of the network equipment.

12. The system of claim 8, wherein the alarm processing application checks the NOC queue for an enriched alarm that matches a created enriched alarm before placing the created enriched alarm on the NOC queue, whereby duplicate enriched alarm entries in the NOC queue are avoided.

13. The system of claim 8, wherein the alarm processing application does not build enriched alarms for alarms belonging to an alarm category unsupported by the NOC tool.

14. A method of providing telecommunications network infrastructure alarms, comprising:
pulling, on a periodic basis, by an alarm collection application executing on a computer system, a plurality of alarms from a source alarm data store on a server computer a periodic basis, wherein each of the plurality of alarms comprise a failed state of a piece of equipment or an underperformance of a piece of equipment;
placing, by the alarm collection application, the plurality of alarms on a process pending queue;
taking, by an alarm processing application executing on a computer system, the plurality of alarms off the process pending queue;
for each alarm of the plurality of alarms, determining, by the alarm processing application, an identity of an item of network equipment inventory corresponding to the alarm;
for each alarm of the plurality of alarms, determining, by the alarm processing application, a fault key based on the identity of the item of network equipment associated with the alarm;
determining, by the alarm processing application, an alarm key for each alarm of the plurality of alarms, wherein the alarm key comprises an identity of a server computer associated with the source alarm data store, a serial number associated with the alarm associated with the alarm key, and a date-time stamp of the alarm associated with alarm key;
determining, by the alarm processing application, an alarm signature for each alarm of the plurality of alarms;
identifying, by the alarm processing application, alarms of the plurality of alarms that have different alarm keys but that are related to the same on-going alarm events;
determining, by the alarm processing application, that an enriched alarm has been transmitted to a network operations center (NOC) tool related to the on-going alarm events and suppressing transmission of a plurality of additional enriched alarms related to the on-going alarm events to the NOC tool, wherein the NOC tool is executed on a separate computer system;
placing, by the alarm processing application, a plurality of enriched alarms on a network operations center (NOC) queue, wherein each of the plurality of enriched alarms comprise the alarm key, the alarm signature, and a management identity of the item of network equipment corresponding to the alarm looked up from a telecommunications network equipment inventory data store on a server computer based on the fault key, and wherein the plurality of enriched alarms placed on the NOC queue do not include enriched alarms related to the on-going alarm events;
sorting, by the alarm processing application, the plurality of enriched alarms on the NOC queue according to the network equipment inventory identity associated with the plurality of enriched alarms onto different execution threads for each of a plurality of different cell sites; and
transmitting the plurality of enriched alarms by each execution thread to the NOC tool in a time sequenced order based on a date-time stamp in the corresponding alarm key of each of the plurality of enriched alarms.

15. The method of claim 14, wherein the periodic basis is about one minute.

16. The method of claim 14, wherein the alarm processing application begins taking the plurality of alarms off the process pending queue after the alarm collection application completes execution and completes processing the collected alarms before a subsequent periodic execution of the alarm collection application.

17. The method of claim 14, wherein the plurality of enriched alarms further comprise an alarm severity.

18. The method of claim 14, wherein the on-going alarm events comprise a generator running alarm event.

19. The method of claim 14, further comprising aging some of the plurality of enriched alarms on the NOC queue before sorting the some of the plurality of enriched alarms, wherein aging comprises delaying sending the some of the plurality of enriched alarms.

* * * * *